July 15, 1947.   H. H. ALLEN ET AL   2,424,134
EGG SEPARATOR
Filed April 23, 1945

Inventors
Holly H. Allen,
Auburn Taylor

By *[signature]*
Attorney

Patented July 15, 1947

2,424,134

UNITED STATES PATENT OFFICE 2,424,134

EGG SEPARATOR

Holly H. Allen and Auburn Taylor, Charleston, W. Va.

Application April 23, 1945, Serial No. 589,770

3 Claims. (Cl. 146—2)

This invention relates to an improved egg separator designed to expeditiously and efficiently separate the albumen from the vitellus of an egg.

It is an object of the invention to provide a standard having an egg receptacle attached to each end, one of the receptacles serving as a pedestal to support the standard in a bowl or dish while the other receptacle co-acts with a funnel by means of which a broken egg is deposited into the receptacle, the size of the receptacle being such that when the funnel is removed the albumen will overflow the edge of the receptacle in a volume sufficient to cause the albumen to break loose from the vitellus.

A further object of the invention resides in providing a device of the above-mentioned character which is simple and durable in construction, easy to keep in a sanitary condition and inexpensive to manufacture.

Other objects and advantages of the invention will be apparent during the course of the following description.

Figure 1:
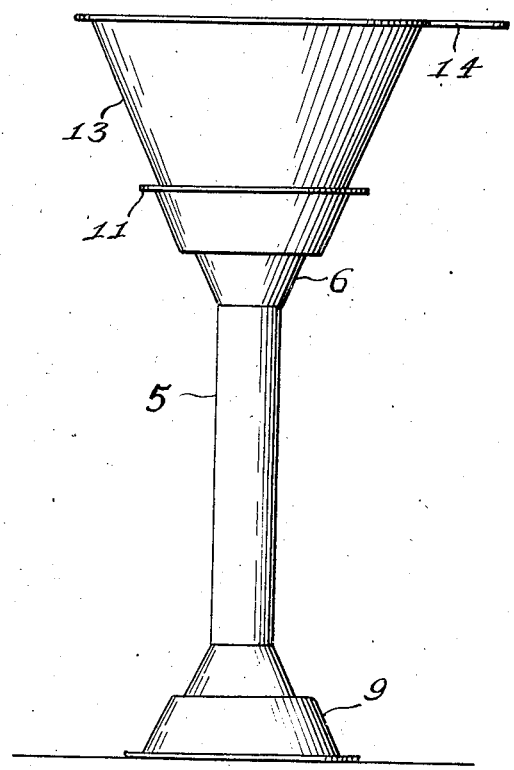
Figure 2:
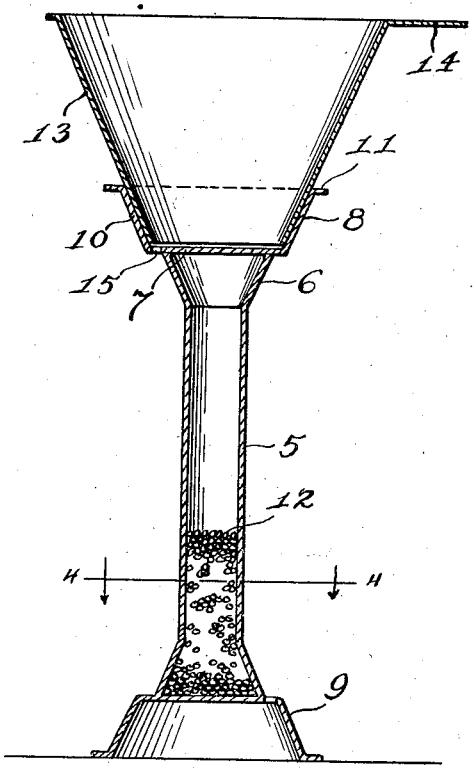
Figure 3:
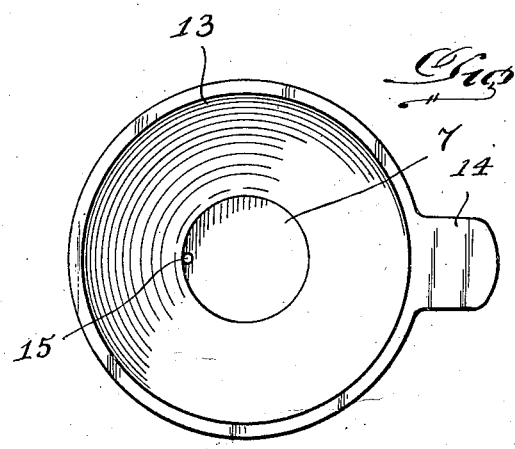
Figure 4:
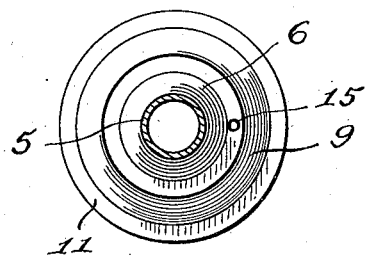

In the accompanying drawing forming a part of this specification and wherein like numerals are employed to designate like parts throughout the same, Fig. 1 is a side elevational view of the invention, Fig. 2 is a vertical sectional view of the device, Fig. 3 is a top plan view, and, Fig. 4 is a sectional view taken on the line 4—4 of Fig. 2.

In the drawing wherein for the purpose of illustration a preferred embodiment of the invention is shown the numeral 5 denotes a tubular standard having each of its ends flared, as at 6, for attachment to the bottom wall 7 of receptacles 8 and 9. The receptacles are adapted to receive a broken egg, one of the receptacles being slightly smaller than the other to receive small size eggs. The side wall 10 of each receptacle is flared outwardly and surrounding the edge of the wall is an outwardly extending lateral flange 11. Either of the receptacles may serve as the pedestal for supporting the standard in an upright position in a bowl or dish. The standard is partially filled with shot 12 which gravitates to the lower end of the standard to add weight to the pedestal to prevent upsetting of the standard when in use.

A cone shaped funnel 13 is provided for co-action with the receptacles 8 and 9, the lower end of the funnel being adapted to snugly fit in the receptacles. A lateral tab 14 extends from the upper edge of the funnel and serves as a handle for lifting the funnel to insert or remove it from the receptacle. The bottom wall 7 of each receptacle at its marginal edge is provided with a small orifice 15 for the escape of air when the standard is replaced in the bowl containing the albumen after the separation of each egg, thus avoiding the formation of air pockets.

In use, the device is placed in the bowl or dish in which the albumen is to be collected and may be readily inverted to bring either the small or large receptacle into use depending on the size of the egg to be separated. The funnel is placed in the receptacle and then the egg is broken in the funnel. The funnel directs the egg into the receptacle and retains it there until it is determined if the egg is good or bad. If the egg is bad the device with the funnel intact may be lifted from the bowl and the egg discarded. If the egg is good the funnel is removed from the receptacle which releases the entire volume of albumen at once so that it flows with sufficient force over the edge of the receptacle to completely separate the albumen from the vitellus. If the chalaza does not break away from the vitellus it may be easily severed by pressing the chalaza fiber against the flange surrounding the receptacle. The device is designed to insure the deposit of the egg in the receptacle without breaking the vitellus and when the funnel is removed the albumen is free to flow over the edge of the receptacle without interruption.

It is to be understood the form of invention herein shown and described is a preferred embodiment of the same and that certain changes in the shape, size and arrangement of the parts may be made without departing from the spirit of the invention or the scope of the subjoined claims.

Having thus described our invention, we claim:

1. An egg separator comprising a tubular standard, a receptacle secured to and covering each end of the standard adapted to either serve as a pedestal for the standard or for receiving the egg to be separated, and shot partially filling said standard adapted to gravitate to the lower end of said standard against the bottom of the receptacle serving as the pedestal to weight the pedestal down.

2. An egg separator comprising a tubular standard flared at both ends, a flat bottom conical receptacle attached to each flared end of said standard, the upper edge of the receptacle wall being bent outwardly at right angles to the longitudinal axis of said standard to provide an annular flange, and a removable funnel having tapered walls corresponding to the taper of the walls of said receptacles adapted to snugly nest in either of the receptacles, one of said receptacles serving as a pedestal to support said standard in an upright position.

3. An egg separator comprising a tubular standard having flared ends, a flat bottom conical receptacle secured to each of the flared ends of said standard, one of said receptacles serving as a pedestal to support said standard in an upright position, and shot partially filling said standard adapted to gravitate to the lower end of the standard against the bottom of the receptacle serving as the pedestal to weight the pedestal down.

HOLLY H. ALLEN.
AUBURN TAYLOR.

REFERENCES CITED

The following references are of record in the file of this patent:

UNITED STATES PATENTS

| Number | Name | Date |
|---|---|---|
| 1,214,720 | Sobeck | Feb. 6, 1917 |
| 1,759,512 | Kramer et al. | May 20, 1930 |
| 1,075,477 | Hutchinson | Oct. 14, 1913 |
| 808,507 | Blue | Dec. 26, 1905 |

FOREIGN PATENTS

| Number | Country | Date |
|---|---|---|
| 532,942 | France | Feb. 15, 1922 |
| 231,654 | Germany | Feb. 28, 1911 |